(12) United States Patent
Mafra-Neto

(10) Patent No.: US 6,385,544 B1
(45) Date of Patent: May 7, 2002

(54) METHOD FOR PEST MANAGEMENT AND CROP CERTIFICATION UTILIZING NETWORK ACCESSIBLE DATABASE

(76) Inventor: Agenor Mafra-Neto, 2287 Knob Dr., Riverside, CA (US) 92506

( * ) Notice: Subject to any disclaimer, the term of this patent is extended or adjusted under 35 U.S.C. 154(b) by 0 days.

(21) Appl. No.: 09/776,807

(22) Filed: Feb. 5, 2001

(51) Int. Cl.[7] .............................................. G06F 19/00
(52) U.S. Cl. ........................................................ 702/5
(58) Field of Search .................... 702/5, 3, 2; 706/930, 706/931, 928, 929, 925

(56) References Cited

U.S. PATENT DOCUMENTS 5,828,751 A * 10/1998 Walter et al. ................. 380/25
5,845,229 A * 12/1998 Rawlins .......................... 702/2
5,884,224 A *  3/1999 McNabb et al. ............... 702/2

* cited by examiner

*Primary Examiner*—Donald E. McElheny, Jr.
(74) *Attorney, Agent, or Firm*—Stetina Brunda Garred & Brucker

(57) ABSTRACT

In accordance with the present invention, there is provided a method of pest management and crop certification of crops by a grower. The method includes gathering pest sampling data in connection with a crop of the grower, the pest sampling data including locational information thereof. The gathered pest sampling data is transmitted to a pest sampling database. The pest sampling database includes pest sampling data regarding respective crops from a plurality of other growers. The pest sampling database is in electrical communication with pest management analysis software for generation of pest management analysis which is received by the grower. The crop is harvested and a crop certification is received regarding the crop based upon the generated pest management analysis.

32 Claims, 2 Drawing Sheets

METHOD FOR PEST MANAGEMENT AND CROP CERTIFICATION UTILIZING NETWORK ACCESSIBLE DATABASE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to pest management systems, and more particularly to a system and method for pest management and crop certification utilizing a network accessible database.

Integrated pest management is an informational science of obtaining accurate information regarding the many factors that affect the density, distribution, and dynamics of pest populations. The ultimate goal has always been to use that information to integrate control measures. Pest control measures are triggered either by the presence of a particular pest or by a threshold density of that pest, taking into consideration the phenology of the affected crop, and the physical and biological characteristics of the environment at a given time. Data on various physical and biological parameters must be collected, tabulated, filtered, statistically analyzed and compared, so that good decisions for effective pest control can be made and implemented in a timely fashion. There is, therefore, an ever-increasing demand for reliable, current data that reflect actual conditions found in the field upon which pest control management decisions can be based.

Pest management, control and monitoring programs frequently suffer from a lack of reliable information. For a monitoring program to be effective, information has to swiftly flow through a sequence that starts with data gathered in the field, which is passed through local supervisors and more central decision makers, and ends up with those who are responsible for the implementation of pest control measures.

A typical management program will include many branches for data management. The branches may have structural differences, may be operated by people belonging to different agencies, and may be located in different areas. Not surprisingly, bottlenecks in the flow of information are common. These bottlenecks may be caused by slow or imprecise data gathering or by slow and inefficient data processing. The result is information flowing too slowly to the decision maker. Further, inefficient or inconsistent data management can result in poorly collected data or a failure to separate relevant information from that which is irrelevant. Problems with information flow may generate reports with little useful information, resulting in poor decision-making and ineffectual control measures. Poor data management is damaging for small programs, but the situation becomes nearly unmanageable when data management problems occur in large area-wide pest management programs.

The food production industry has been plagued not only by pests that compromise crop and food quality but also with the task of managing information to control these pests. Indigenous and established arthropod pests are a major concern for farmers and ranchers and are the subject of study for entire divisions of large governmental agencies. The introduction of exotic pests is especially problematic for the agricultural industry. The industry is affected directly, by pest damage and extra expenses incurred through controlling new exotic pests, and indirectly, through trade barriers aimed at infested commodities by pest-free importing regions. Once a pest is established, the cost of control is permanent. An increase in imported goods, fostered by trade agreements between states, increases the risk of introduction of new pests.

Collaborative efforts will play an ever more critical role in the management of exotic pests. Many regional and even intercontinental task forces have been created to manage and combat exotic insect pests. These task forces require concerted, area-wide interventions, and are usually far more effective than the somewhat erratic, asynchronous interventions that individual farmers may perform when not involved in regionally controlled management efforts.

When an exotic pest is the focus of a management program, it is likely that the program involves different organizations, including agencies from city, county, state, and federal governments, as well as interested private groups. The organization for the monitoring and detection tasks may be flexible and relaxed. Different groups will collect different types of information, based upon their own particular agendas, which is then stored in databases at various locations. It is likely that these databases do not use the same software and are maintained and edited by persons of varying expertise, who use different criteria and protocols to handle and analyze the data. The unexpected detection of an exotic pest results in an emergency situation requiring a drastic change in this flexible organization. Pest eradication requires a program that is well coordinated. For emergency situations the organizational structure of a program has to be well established. All historical data and newly collected data have to be readily available and rapidly analyzed so the emergency regional pest control effort can make rapid, effective decisions.

Existing pest management programs vary in degree of sophistication. Most common is the approach in which farmers spray fields following a calendar schedule. The implementation of control measures is triggered based on historical data and executed regardless of the presence of or the density of the pest. This approach is generally attractive to growers due to its simplicity and ease of implementation. However, this approach frequently results in unnecessary insecticide applications, which may ultimately result in a plethora of agro-ecological problems including environmental contamination, ecological imbalance, and suppression of natural enemy populations.

More sophisticated regional strategies exist that monitor physical and biological environment and use the data to determine if populations are above or below thresholds to determine if control action is needed, referred to in the industry as the "threshold" approach. Such a pest control strategy has he advantage of being a good predictive power of pest population dynamics using modeling techniques. If pest control action is necessary, it is directed to the areas where pest populations are found at higher densities, or where they are escaping their natural enemies control. This strategy in turn has a lower impact on the argo-ecosystem, and is the basis for the development of more sustainable agriculture. The difficulty with this approach is that it requires better than average organizational skills, a commitment from the farmer, the use of standardized methods of data collection, and enough allocation of time to perform the careful, consistent monitoring needed to support good decision-making.

Accordingly, there is a need in the art for an improved method of pest management in comparison to the prior art.

BRIEF SUMMARY OF THE INVENTION

In accordance with an embodiment of the present invention, there is provided a method of pest management and crop certification of crops by a grower. The method includes gathering pest sampling data in connection with a crop of the grower. The pest sampling data includes locational information thereof. The gathered pest sampling data is transmitted to a pest sampling database. The pest sampling database includes pest sampling data regarding respective crops from a plurality of other growers. The pest sampling database is in electrical communication with pest management analysis software for generation of pest management analysis. The generated pest management analysis is received and the crop is harvested. A crop certification of the harvested crop is received based upon the generated pest management analysis.

In an embodiment of the present invention, the locational information is gathered using an electronic locational device. Preferably, the electronic locational device is a global positioning system (GPS) based device. Further, pest sampling data may be gathered utilizing a portable computer, such as a palm device. The pest sampling data may be downloaded from the portable computer to a local computer. The pest sampling data may be transmitted from the local computer to a remote computer which is in electrical communication with the pest sampling database and the pest management analysis software. The pest sampling data may be transmitted via a computer network, such as the Internet. The pest sampling data may be transmitted via a wireless device. The pest management analysis may also be received via a computer network. Further, the crop certification may be received via a computer network. In addition, the pest control analysis may include a pest control recommendation. In this regard, the method may further include implementing the pest control recommendation and repeating the steps of gathering, transmitting and receiving pest control analysis.

In accordance with another aspect of the present invention, there is provided a method pest management by a grower. The method includes gathering pest sampling data in connection with a crop of the grower using a portable computer and an electronic locational device. The pest sampling data includes locational information thereof gathered using the locational device. The gathered pest sampling data is transmitted from the portable computer to a pest sampling database. The pest sampling database includes pest sampling data regarding respective crops from a plurality of other growers. The pest sampling database is in electrical communication with pest management analysis software for generation of pest management analysis. The generated pest management analysis is electronically received by the grower.

In accordance with yet another aspect of the present invention, there is provided a method of providing pest management and crop certification of crops of a plurality of growers. The method includes establishing a relationship with the plurality of growers wherein each of the growers agrees to gather pest sampling data in connection with a crop of the grower. The pest sampling data includes locational information thereof. Gathered pest sampling data is electronically received from the growers. The pest sampling data is electronically stored in a pest sampling database. Pest management analysis is generated with pest management analysis software using the pest sampling database for a crop of a respective one of the growers. A crop certification of a crop of the respective one of the growers is issued based upon the generated pest management analysis. The method may further include providing access to data from the pest management database to a third party. In this regard, database access criteria may be received from a respective one of the growers, and access to data from the pest management database regarding crops of the respective one of the growers may be selectively provided to the third party based upon the received database access criteria.

As such, based on the foregoing, the present invention mitigates the inefficiencies and limitations associated with prior art pest management methods. Accordingly, the present invention represents a significant advance in the art.

BRIEF DESCRIPTION OF THE SEVERAL VIEWS OF THE DRAWING

These, as well as other features of the present invention, will become more apparent upon reference to the drawings wherein.

DETAILED DESCRIPTION OF THE INVENTION

Figure 1:
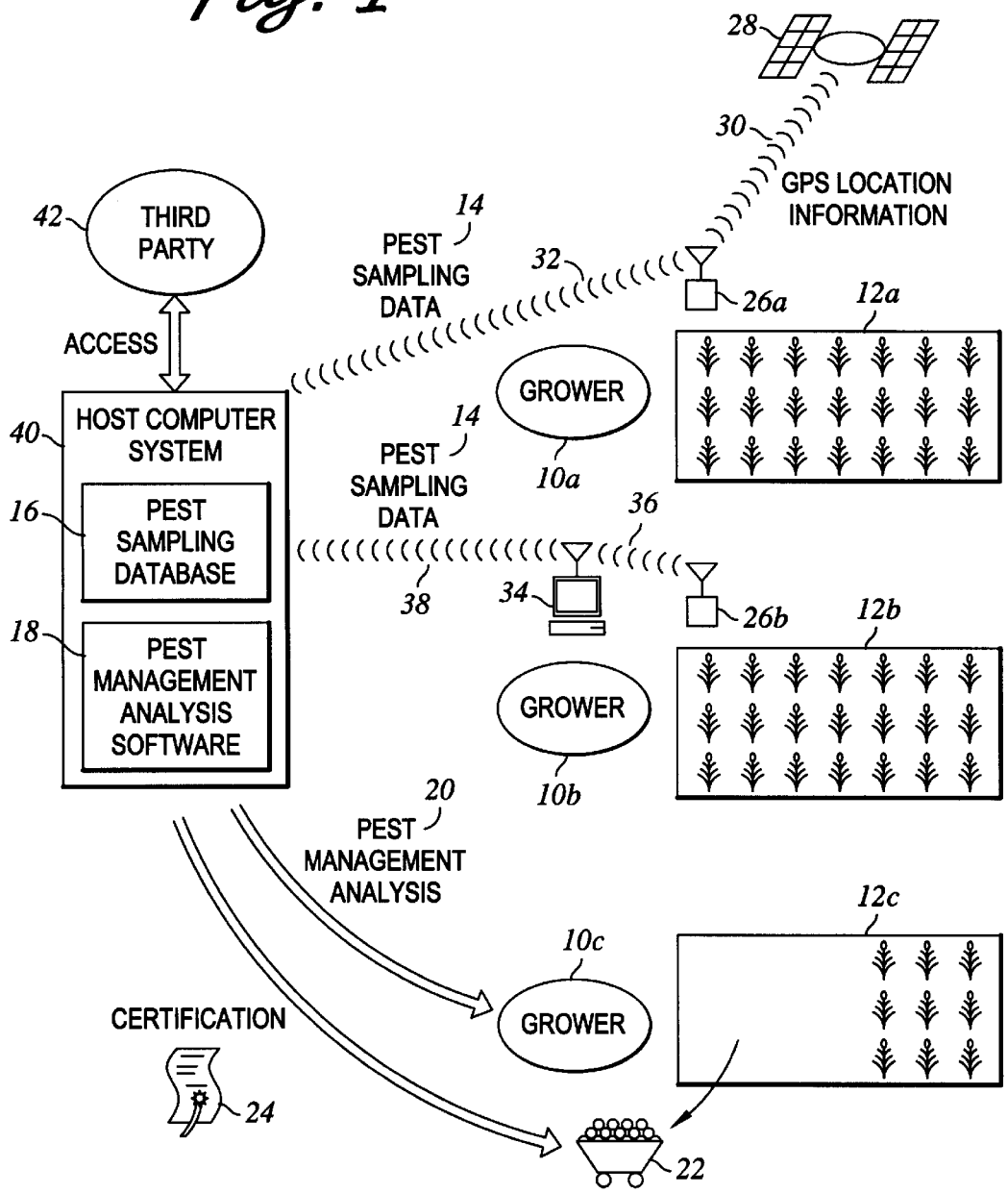
FIG. 1 is a symbolic relational diagram depicting the pest sampling database utilized by growers in accordance with a method of the present invention.
Figure 2:
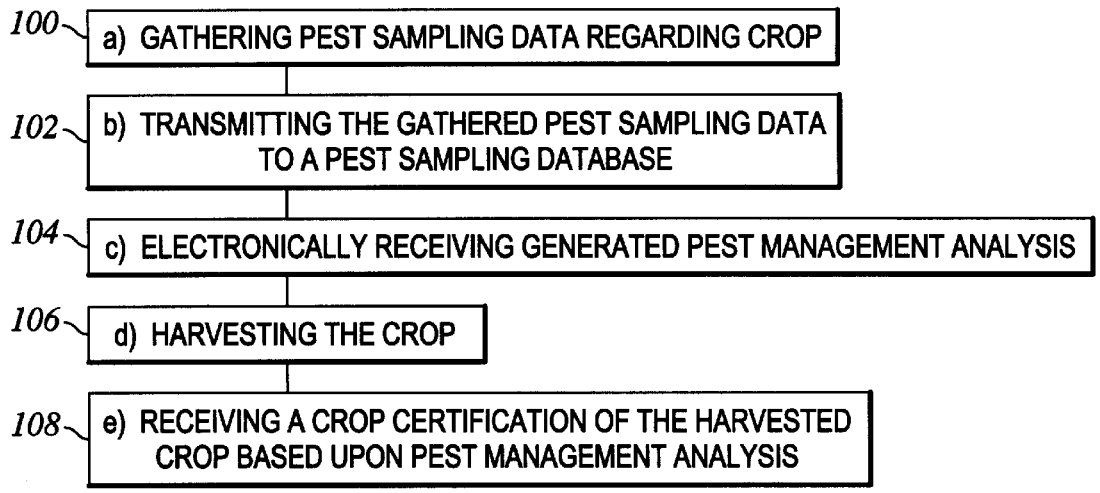
FIG. 2 is a flow chart of a method of an aspect of the present invention.
Figure 3:
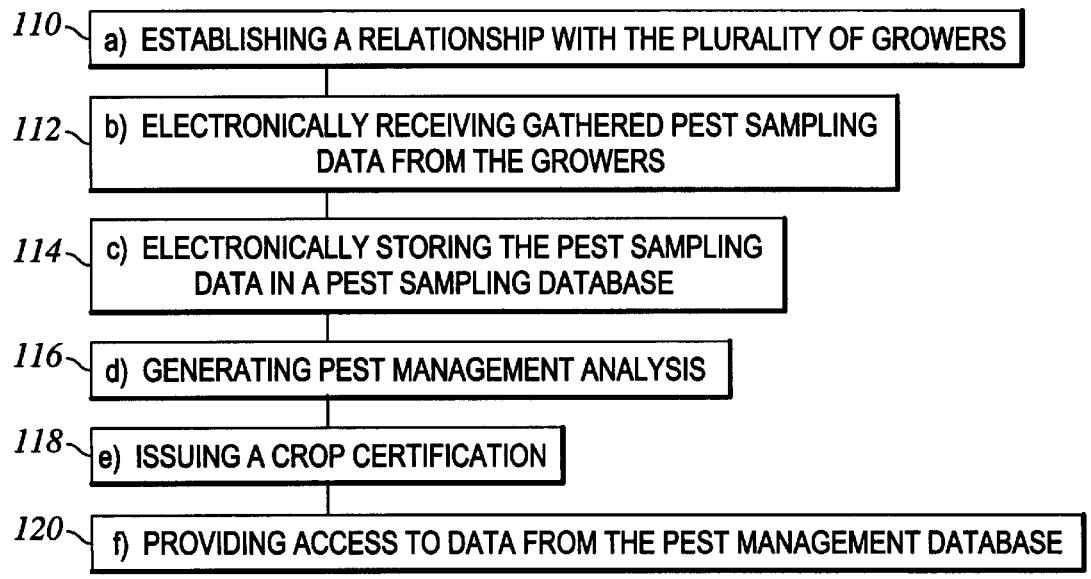
FIG. 3 is a flow chart of a method of another aspect of the present invention.

Referring now to the drawings wherein the showings are for purposes of illustrating a preferred embodiment of the present invention only, and not for purposes of limiting the same, FIGS. 1–3 illustrate a preferred system and method for implementing the present invention.

Referring now to FIG. 1 there in depicted a symbolic relational diagram depicting the pest sampling database utilized by growers in accordance with a method of the present invention, a flow chart of which is depicted in FIG. 2. As will be discussed in more detail below, the present method is specifically adapted to provide incentives for many growers to participate so as to result in an integrated database of information which may be utilized for a variety of purposes by a variety of entities.

As such, there is provided a method of pest management and crop certification of crops 12 by growers 10. As used herein growers 10 is used to refer generally to a grower or growers with specific examples depicted in FIG. 1 as 10a, b and c. Similarly, as used herein crops 12 is used to refer generally to a crop or crops with specific examples depicted in FIGS. 1 as 12a, b and c.

The method includes gathering 100 pest sampling data 14 in connection with a crop 12 of a grower 10. For example, grower 10a may gather 100 pest sampling data 14 in connection with the grower's crop 12a. In this regard, the following discussion will focus upon the perspective of the growers 10. The pest sampling data 14 includes locational information thereof. The gathered pest sampling data 14 is transmitted 102 to a pest sampling database 16. The pest sampling database 16 includes pest sampling data regarding respective crops 12 from a plurality of other growers 10. In this regard for example, to the extent grower 10a practices the method of the present invention, the other growers may include growers 10b and 10c. The pest sampling database 16 is in electrical communication with pest management analysis software 18 for generation of pest management analysis 20. The generated pest management analysis 20 is received 104 by the grower 10 and the crop 12 is harvested 106 resulting in a harvested crop 22. For example, grower 10c is depicted as receiving 104 pest management analysis 20 in connection with the grower's crop 12c. A crop certification 24 of the harvested crop 22 is received 108 based upon the generated pest management analysis 20. For example, grower 10c is depicted as receiving 108 a crop certification 24 in connection with the grower's harvested crop 22 based upon the received pest management analysis 20 regarding the grower's crop 12c.

As mentioned above, the method includes gathering 100 pest sampling data 14 in connection with a crop 12 of a grower 10. Further, the pest sampling data 14 may be gathered 100 utilizing a portable computer 26, such as 26a and 26b as depicted. As such, the portable computer 26 may be advantageously taken directly into the field for collection of pest sampling data 14. As used herein, the term computer includes any of those computing devices which are well known to one of ordinary skill in the art. For example, such computing devices may include laptop computers, terminals, hand-held or palm devices, etc.

The pest sampling data 14 may include information which is well known to one of ordinary skill in the art such as information regarding pest populations and infestation, crop condition, climatological information, method of pest control used, for example. It is understood that the nature of the data will vary in degree, format and type depending upon the level of sophistication of the pest management analysis software 18 which is utilized. It is contemplated that such pest sampling data 14 may be collected in the field. In particular, it is contemplated that precise locational data is desirable. In this regard, in an embodiment of the present invention, the locational information is gathered using an electronic locational device which may be integrated with the portable computer 26, such as 26a and 26b as depicted. Preferably, the electronic locational device is a global positioning system (GPS) based device such as portable computer 26a. In this regard, the portable computer 26a is symbolically depicted as being in electronic communication with a GPS satellite 28 via a data link 30. In another arrangement, the portable computer 26 may be provided with an optical scanner. An operator may simply scan in predetermined locational data which may be stored in the form of a bar code which is disposed adjacent a pest sampling or trapping location, for example. In this regard, it is envisioned that because the pest sampling data 14 is electronically inputted, such GPS and data scanning technologies may provide a means for capturing highly accurate locational data while being relatively easy to employ or implement by a grower 10.

Having gathered 100 the pest sampling data 14, the method provides for transmitting 102 such pest sampling data 14 to the pest sampling database 16. The present method contemplates that such a data transfer may be effected in any number of ways. In one embodiment, the portable computer 26 may be a wireless device which may transmit from the field the pest sampling data 14. In this regard, portable computer 26a is depicted as having a symbolic data link 32 to the pest sampling database 16. The particular techniques and hardware and software requirements for effecting such a wireless transfer may be chosen form those which are well known to one of ordinary skill in the art and may include cellular or radio frequency technology for example.

In another arrangement, the pest sampling data 14 may be downloaded from a portable computer 26b to a local computer 34. In this regard, a given grower 10 (such as grower 10b) may utilize many portable computers 26 (such as portable computer 26b) in the field which may be then taken back to the grower's facility having the local computer 34 thereat. In this regard, the collected pest sampling data 14 may be transferred and compiled at the local computer 34. Such a data transmission or transfer may simply take the form of the data being recorded upon a data disk and physically downloaded to the local computer 34. A more sophisticated arrangement may include a more automated transmission which may include the portable computer 26b establishing an electronic data link 36 with the local computer 34. As such, the pest sampling data 14 may be transmitted via a more direct electronic connection, such as by the local computer 34 having a docking bay for receiving communications from the portable computer 26b. In another arrangement, the portable computer 26b may communicate with the local computer 26b via a wireless link. As such, the electronic data link 36 symbolically indicates some form of data transfer from the portable computer 26b to the local computer 34. The particular techniques, hardware and software requirements for effecting such data transfer from the portable computer 26b to the local computer 34 may be chosen from those which are well known to one of ordinary skill in the art and may includes cellular or radio frequency technology for example.

In addition, it is contemplated that the local computer 34 electronically communicates with the pest sampling database 16. Conveniently, the pest sampling data 14 may be transferred from the local computer 34 to the pest sampling database 16 via a computer network. While the computer network is preferably what is currently understood as the Internet, other computer network arrangements may be included, such as local area networks (LANs), intranets, extranets, private networks, virtual private networks, integrated services digital networks (ISDNs), etc. The particular techniques and hardware and software requirements for effecting such data transfer from the local computer 34 to the pest sampling database 16 may be chosen form those which are well known to one of ordinary skill in the art and may include telephony based systems, cable (Digital Subscriber Lines (DSL) and variations thereof, wire, optical, etc.), optical communications (including infrared), and wireless forms of communications, such as those based upon cellular, satellite, radio frequency (RF) and other forms of electromagnetic wave based mediums.

It is contemplated that a remote or host computer system 40 may host or otherwise be disposed in electronic communication with the pest sampling database 16 and the pest management analysis software 18. The host computer system 40 may be disposed in communication with a computer network. In the case where the computer network is the Internet, it is contemplated that host computer system 40 may be interfaced or hosted at a web address. As such, access or utilization of the host computer system 40 may be provided by an application service provider (ASP) for example. The particular techniques and hardware and software requirements for operation of the host computer system 40 insofar as data processing between the pest sampling database 16 and the pest management analysis software 18 may be chosen form those which are well known to one of ordinary skill in the art. It is also contemplated that the pest sampling database 16 and/or the pest management analysis software 18, including portions thereof, need not be hosted remotely as discussed above but may also be deployed at a local computer 34 in even in a portable computer 26 (such as 26a or 26b) for use in the field.

The pest management analysis software 18 may be based upon any variety of algorithms and software modules which are well known to one of ordinary skill in the art. In this regard, the pest management analysis software 18 is configured to generate pest management analysis 20 regarding a given grower's crops 12, such as in connection with the crops 12c of grower 10c. Such analysis may be received 104 or otherwise accessed by the grower 10c via a computer network.

In addition, the pest control analysis 20 may include a pest control recommendation, such as utilization of certain pesticide applications for example. In this regard, the method may further includes implementing the pest control recommendation, and subsequently repeating the steps of gathering 100, transmitting 102 and receiving 104 pest control analysis 20.

At some point the growers 10 will harvest 106 their crops 12 resulting in harvested crops 22. It is contemplated that such crops 12 or 22 may need to be inspected by a variety of entities, ranging from regulatory agencies to anyone in the supply chain of disposition of the harvested crops 22. Importantly, according to an aspect of the present invention, a crop certification 24 of the harvested crop 22 is received 108 based upon the generated pest management analysis 20. The crop certification 24 may be received via a computer network. This may take the form of access to such information or an actual electronic communication. It is contemplated that such a certification 25 may parallel or at least be in a form and content required to base a certain regulatory approval or decisions concerning the disposition of the crop 12 or harvested crop 22 at issue. In this regard, such a certification process may circumvent or at least mitigate pest investigation and testing burdens or duties by those entities responsible for such regulatory approval or decisions concerning the disposition of the crops 12 or harvested crops 22 at issue. Such reduction in burden may directly translate to mitigation of fees or costs which may have been bourne by the growers 10 or passed along to those in the distribution chain. Further, such a certification process is efficient from a time saving point of view thereby speeding the approval or decision making processes allowing for the harvested crops 22 to more readily enter the distribution chain.

Referring now to FIGS. 1 and 3, in accordance with another aspect of the present invention, there is provided a method of providing pest management and crop certification of crops 12 of a plurality of growers 10. In this regard, the following discussion will focus upon the perspective of an operator of the host computer system 40.

The method includes establishing 110 a relationship with the plurality of growers 10 wherein each of the growers agrees to gather pest sampling data 14 in connection with a crop 12 of the grower 10. The pest sampling data 14 includes locational information thereof. The gathered pest sampling data 14 is electronically received 112 from the growers 10. The pest sampling data 14 is electronically stored 114 in a pest sampling database 16. Pest management analysis 20 is generated 116 with pest management analysis software 18 using the pest sampling database 16 for a crop 12 of a respective one of the growers 10. A crop certification 24 of a crop 12 or harvested crop 22 of the respective one of the growers is issued 118 based upon the generated pest management analysis 20.

The method may further includes providing 120 access to data from the pest management database 16 to a third party 42. In this regard, database access criteria may be received form a respective one of the growers 10, and access to data from the pest management database 18 regarding crops 12 o the respective one of the growers 10 may be selectively provided to the third party 42 based upon the received database access criteria. It is contemplated that a variety of third parties 42 may have interest in the data or derivative data from the pest management database 16. For example, such information may be useful to governmental agencies, entities conducting research or education, entities involved in pest control (such as pesticide manufacturers), health related organizations, and even those interested in commodities trading. Moreover, it is contemplated that such 120 access to data from the pest management database 16 to such third party 42 may take the form of insertion of data as well.

In view of the foregoing, it is contemplated that the various efficiencies of the methods of the present invention provide substantial incentives for participation by growers 10. Through timely and disciplined gathering 100 of the pest sampling data 14, the growers 10 are provided with timely, more accurate pest data analysis 20 which may include corrective or control recommendations. Thus, the earlier a grower 10 can implement such recommendations, costly pest control infestation and establishment problems may be avoided. Further, it is contemplated that as the number of participating growers 10 increases, a more comprehensive, integrated, and accurate pest sampling database 16 results. This in turn is contemplated to result in a higher, more comprehensive, and timely pest management analysis 20.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of pest management and crop certification of crops by a grower comprising the steps of:

a) gathering pest sampling data in connection with a crop of the grower, the pest sampling data including locational information thereof;

b) transmitting the gathered pest sampling data to a pest sampling database, the pest sampling database including pest sampling data regarding respective crops from a plurality of other growers, the pest sampling database being in electrical communication with pest management analysis software for generation of pest management analysis;

c) electronically receiving the generated pest management analysis;

d) harvesting the crop; and e) receiving a crop certification of the harvested crop based upon the generated pest management analysis.

2. The method of claim 1 wherein step a) the locational information is gathered using an electronic locational device.

3. The method of claim 2 wherein step a) the electronic locational device is a global positioning system (GPS) based device.

4. The method of claim 1 wherein step a) the pest sampling data is gathered utilizing a portable computer.

5. The method of claim 1 wherein step a) the pest sampling data is downloaded from the portable computer to a local computer.

6. The method of claim 5 wherein step b) the pest sampling data is transmitted from the local computer to a remote computer which is in electrical communication with the pest sampling database and the pest management analysis software.

7. The method of claim 1 wherein step b) the pest sampling data is transmitted via a computer network.

8. The method of claim 1 wherein step b) the pest sampling data is transmitted via a wireless device.

9. The method of claim 1 wherein step c) the pest management analysis is received via a computer network.

10. The method of claim 1 wherein step e) the crop certification is received via a computer network.

11. The method of claim 1 wherein the pest control analysis includes a pest control recommendation and step c) further includes implementing the pest control recommendation and repeating the steps of gathering, transmitting and receiving pest control analysis.

12. A method of pest management by a grower comprising the steps of:
 a) gathering pest sampling data in connection with a crop of the grower using a portable computer and an electronic locational device, the pest sampling data including locational information thereof gathered using the locational device;
 b) transmitting the gathered pest sampling data from the portable computer to a pest sampling database, the pest sampling database including pest sampling data regarding respective crops from a plurality of other growers, the pest sampling database being in electrical communication with pest management analysis software for generation of pest management analysis; and
 c) electronically receiving the generated pest management analysis.

13. The method of claim 12 wherein step a) the electronic locational device is a global positioning system (GPS) based device.

14. The method of claim 12 wherein step b) the pest sampling data is transmitted to a remote computer which is in electrical communication with the pest sampling database and the pest management analysis software.

15. The method of claim 12 wherein step b) the pest sampling data is downloaded from the portable computer to a local computer, the pest sampling data is transmitted from the local computer to a remote computer which is in electrical communication with the pest sampling database and the pest management analysis software.

16. The method of claim 12 wherein step b) the pest sampling data is transmitted via a computer network.

17. The method of claim 12 wherein step b) the pest sampling data is transmitted via a wireless device.

18. The method of claim 12 wherein step c) the pest management analysis is received via a computer network.

19. The method of claim 12 further including a step of:
 d) harvesting the crop.

20. The method of claim 19 further including a step of:
 e) receiving a crop certification of the harvested crop based upon the generated pest management analysis.

21. The method of claim 19 wherein step e) the crop certification is received via a computer network.

22. The method of claim 12 wherein the pest control analysis includes a pest control recommendation and step c) further includes implementing the pest control recommendation and repeating the steps of gathering, transmitting and receiving pest control analysis.

23. A method of providing pest management and crop certification of crops of a plurality of growers, the method comprising the steps of:
 a) establishing a relationship with the plurality of growers wherein each of the growers agrees to gather pest sampling data in connection with a crop of the grower, the pest sampling data including locational information thereof;
 b) electronically receiving gathered pest sampling data from the growers;
 c) electronically storing the pest sampling data in a pest sampling database;
 d) generating pest management analysis with pest management analysis software using the pest sampling database for a crop of a respective one of the growers; and
 e) issuing a crop certification of a crop of the respective one of the growers based upon the generated pest management analysis.

24. The method of claim 23 wherein step b) the pest sampling data is received via a computer network.

25. The method of claim 23 wherein step c) includes hosting the pest sampling database by a remote computer.

26. The method of claim 23 wherein step d) includes hosting the pest management analysis software by a remote computer.

27. The method of claim 23 wherein step d) further includes transmitting the generated pest management analysis to the respective one of the growers.

28. The method of claim 27 wherein step d) the pest management analysis is transmitted via a computer network.

29. The method of claim 23 wherein step e) the crop certification accessible via a computer network.

30. The method of claim 23 wherein step d) the pest control analysis includes a pest control recommendation.

31. The method of claim 23 further including the step of:
 f) providing access to data from the pest management database to a third party.

32. The method of claim 31 wherein step f) further includes receiving database access criteria from a respective one of the growers, and selectively providing access to data from the pest management database regarding crops of the respective one of the growers to the third party based upon the received database access criteria.

* * * * *